United States Patent Office.

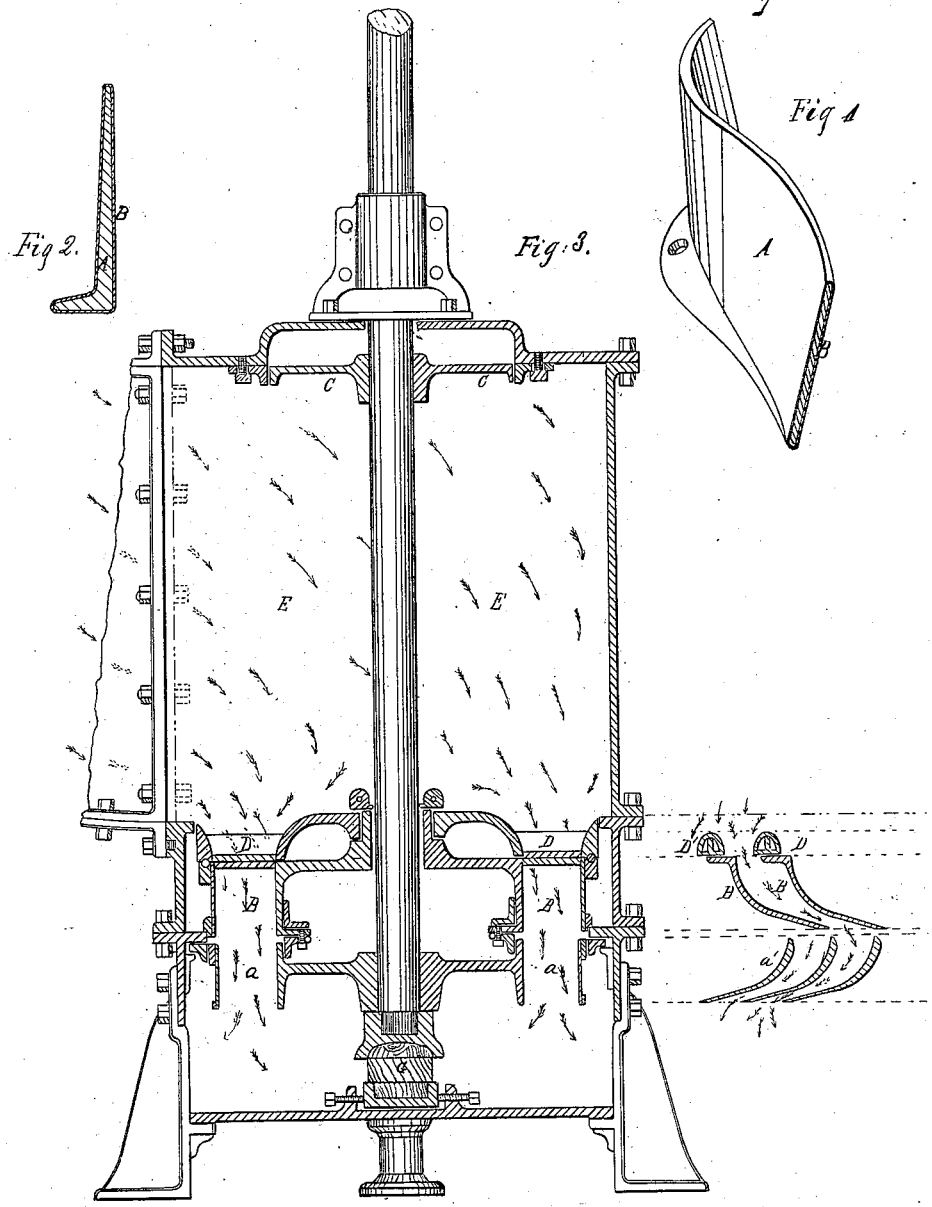

JAMES P. COLLINS, OF TROY, NEW YORK.

*Letters Patent No. 77,588, dated May 5, 1868.*

IMPROVEMENT IN WATER-WHEELS.

*The Schedule referred to in these Letters Patent and making part of the same.*

TO ALL WHOM IT MAY CONCERN:

Be it known that I, JAMES P. COLLINS, of the city of Troy, county of Rensselaer, and State of New York, have invented a new and useful "Improvement in Water-Wheels;" and I do hereby declare that the following is a full, clear, and exact description thereof, reference being hereby had to the accompanying drawings, made in two sheets, to wit, Sheet I and Sheet II, and to the letters of reference marked thereon, and making a part of this specification.

Like letters represent and refer to like or corresponding parts of my said invention and improvement.

Figure 1, Sheet I, is a perspective view of one of the buckets of my said improved water-wheel, and having and containing an enamelled surface or enamelled surfaces, and each more fully described and set forth hereinafter in this specification.

Figure 2, Sheet I, represents a transverse section of the same, and more fully described and set forth hereinafter in this specification.

Figure 3, Sheet II, of the accompanying drawings, represents one of my new and improved "water-wheels," having and containing enamelled surfaces, for the purposes substantially as herein described, set forth, and claimed, and which water-wheel is properly represented as being arranged and adjusted for work or operation by means of the application and power of water, and which water-wheel, thus arranged, contains my invention and improvements herein contained and set forth.

The nature of my said invention and improvements consists in providing all the surface or surfaces of any or all of that part or portion of any water-wheel exposed to the action, force, or power of the water applied thereto, to give such wheel revolutionary motion for the driving of machinery for manufacturing or other uses and purposes, with suitable enamelling, of some suitable material or compound of materials, and thus and thereby render and create smooth all such parts and surfaces, and thereby allow the water to pass into and through such wheel with very much less resistance, much less obstruction, and with much less friction, and thus and thereby requiring less water to move or drive such wheel for the movement or operation of machinery for manufacturing or other purposes, in the manner and by the means substantially as herein described and set forth.

To enable others skilled in the art to which my said invention and improvement relate to make, construct, use, and put into use the same, I will here proceed to describe the construction or details thereof, which are substantially as follows, to wit:

I apply in some suitable manner, and by any mechanical and convenient means, to any or all parts of metallic water-wheels, which are or may be exposed to the action, power, or force of the water giving motion to the same, a silicious or vitreous substance, whereby an extremely smooth surface is attained or created, so as to allow the water applied to such wheel, for the purpose of giving it power or rotating motion, or operation to machinery for manufacturing or other purposes, to pass into and through such water-wheel with a great reduction of, and with as little friction thereof as possible in the mechanical movements and operations of the wheel, and it being such a reduction and prevention of friction, caused by the passage of water through metallic water-wheels of like construction, as never had been gained in any water-wheel before known. I denominate such silicious or vitreous substance, applied to metallic water-wheels substantially as and for the purposes aforesaid, an enamelling, and, in carrying out or into practical operation my aforesaid invention and improvement, I find that the ordinary and well-known process of enamelling, employed in and for culinary cast-iron vessels, will answer a very good purpose in coating or enamelling the surfaces of any metallic water-wheel, for the purposes substantially as herein contained and set forth. From actual tests, I find that it will not crack under the variations of temperature to which it may be subjected, nor will it shell or peel off from such metallic wheels.

I do not, as is already manifest, confine myself to any precise mode or process of or for enamelling cast-metal or metallic surfaces, but will use any mode or process of enamelling such surfaces which will the better carry into full effect and operation my aforesaid invention and improvement in water-wheels.

The bucket A, Sheet I, may be of any suitable metal and desired form and thickness; and so may it be with each and every of the buckets contained in the water-wheel, seen and represented in, at, and by fig. 3, Sheet II, of the accompanying drawings. The said enamelling, upon the surface or surfaces aforesaid of such water-wheel, is represented and shown at B, Sheet I, of the accompanying drawings, and it is not required to be of very great thickness, as it is not subjected to any very considerable wear in and during the operation of such water-wheel, in the manner aforesaid.

It is manifest that the aforesaid enamelling of the buckets, and of other parts or portions of my said water-wheel, or of any other cast-iron or other metallic water-wheel, and through which water passes, will very materially and successfully reduce friction in the passage of the water through such water-wheel, and oxidation will be prevented in each and every part of said wheel by reason of said enamelling in the manner aforesaid.

The aforesaid enamelling will always preserve, and present to the action of the water passing into and through the water-wheel, even and perfectly smooth surfaces; and the friction being reduced and prevented, in the manner and by the means substantially as herein contained, described, and set forth, it is evident that it will not require as much water in quantity to move, operate, or drive such water-wheel, and the machinery thereto attached, for the purpose of manufacturing, or for any other purpose.

It is much the better to enamel each and every part, and each and every of the surfaces of any water-wheel, constructed in whole or in part of cast iron or of other metal, by the aforesaid enamelling, in the manner and for the purposes substantially as herein described and set forth; but it is manifest that some part, parts, or portion of metallic water-wheels may, in whole or in part, be enamelled in the manner as aforesaid, and thus and thereby reduce upon all such parts or portions thus enamelled the friction, substantially as aforesaid, and which would come within the force and operation and effect of my said invention and improvement in cast-iron or metallic water-wheels.

Having thus described the nature, construction, and operation of my said invention and improvement in water-wheels, what I claim, and desire to secure by Letters Patent of the United States of America, is—

A water-wheel, in whole or in part coated or enamelled with a silicious or vitreous substance, when having a metallic surface or surfaces, so as to prevent oxidation, and to reduce and lessen the friction of the water upon such parts or surfaces of such water-wheel, as and while the water is passing into and through such wheel, so as to give it rotating motion, for the purposes, and in the manner, substantially as herein contained, set forth, and described.

In testimony whereof, I have, on this 10th day of September, hereunto set my hand.

JAMES P. COLLINS.

Witnesses:
  T. NEARY,
  S. F. GREGORY.